United States Patent [19]
Bae

[11] Patent Number: 5,615,491
[45] Date of Patent: Apr. 1, 1997

[54] APPARATUS FOR DRYING THE AIR DUCT OF A VEHICLE AIR CONDITIONER

[75] Inventor: Jongsik Bae, Kyungsangnam-do, Rep. of Korea

[73] Assignee: Hyundai Motor Company, Rep. of Korea

[21] Appl. No.: 541,557

[22] Filed: Oct. 10, 1995

[30] Foreign Application Priority Data

Oct. 12, 1994 [KR] Rep. of Korea ............... 94-26608

[51] Int. Cl.⁶ ............................................ F26B 19/00
[52] U.S. Cl. ................... 34/61; 34/62; 34/68; 62/93; 62/90; 165/43; 165/222; 165/97
[58] Field of Search ........................... 34/60, 61, 62, 34/66, 68, 75, 76; 62/93, 90; 237/12.3 A; 165/43, 222, 97

[56] References Cited

U.S. PATENT DOCUMENTS

| | | | |
|---|---|---|---|
| 3,940,861 | 3/1976 | Frazar | 34/75 |
| 4,102,847 | 3/1977 | Rand | 34/75 |
| 4,976,309 | 12/1990 | Åverin | 165/42 |
| 5,012,859 | 5/1991 | Nakazawa et al. | 165/42 |
| 5,062,473 | 11/1991 | Ostrand et al. | 237/12.3 A |

FOREIGN PATENT DOCUMENTS

| | | |
|---|---|---|
| 2-68213 | 3/1990 | Japan . |
| 5-270254 | 10/1993 | Japan . |

*Primary Examiner*—John M. Sollecito
*Assistant Examiner*—Steve Gravini
*Attorney, Agent, or Firm*—Finnegan, Henderson, Farabow, Garrett & Dunner L.L.P.

[57] ABSTRACT

An apparatus for drying the inside of the air duct of a vehicle air conditioner with heating, cooling and drying mode, which includes a first duct part containing a heater unit, a second duct part containing an evaporation unit, the first and second duct parts forming the air duct, an auxiliary blowing fan for introducing in the cooling and drying mode air firstly into the first duct part to heat the air and supply the heated air to the inside of the second duct part, and a main blowing fan for introducing air firstly into the second duct part then to flow towards the heater unit.

5 Claims, 2 Drawing Sheets 3,615,491

APPARATUS FOR DRYING THE AIR DUCT OF A VEHICLE AIR CONDITIONER

BACKGROUND OF THE INVENTION

1. Field of the Invention

The present invention concerns a vehicle air conditioner, and more particularly an apparatus for drying the inside of the air duct thereof to obviate the opportunity for providing a nest of germs or microorganisms such as virus, bacteria, etc. inside the air duct as well as to prevent foul odours resulting therefrom.

2. Description of the Prior Art

The vehicle air conditioner generally comprises a heater unit and an evaporation unit to provide a comfortable atmosphere for driving, where the heater is to take the heat of the engine, and the evaporation unit is to cool the atmosphere inside the vehicle. The air supplied to such units is forcibly driven by a blowing mechanism such as motor fan. The ventilation openings for introducing the air from the air conditioner to the inside of the vehicle are provided beneath the windshield, on the floor panel, and on he instrument panel. The air duct of the air conditioner communicates with the openings.

In this case, when the air flows through the air duct into the inside of the vehicle, the moisture contained in the air tends to reside in the duct as well as foreign matters such as dust. This causes a nest of germs or microorganisms such as virus, bacteria, etc. resulting in the health problems together with offensive odours. This phenomena occur seriously especially after raining or snowing.

Japanese Laid-Open Patent No. 90-68213 discloses a kind of air conditioner, which has an auxiliary air duct including an auxiliary blowing mechanism for generating a reversing air current to prevent the deposition of foreign matters on the inside of the air duct. However, this means complicates the structure of the air conditioner.

Further, Japanese Laid-Open Publication No. 93-270254 discloses a sanitation means provided in the evaporation unit, which requires about one hour to give a satisfactory effect.

SUMMARY OF THE INVENTION

The object of the present invention is to provide a vehicle air conditioner with means for drying the inside of the air duct thereof when working the air conditioner in cooling mode.

According to the present invention, an apparatus for drying the inside of the air duct of a vehicle air conditioner with heating, cooling and drying mode, comprises:

a first duct part containing a heater unit;

a second duct part containing an evaporation unit, the first and second duct parts forming the air duct;

an auxiliary blowing means for introducing in the cooling and drying mode air firstly into the first duct part to heat the air and supply the heated air to the inside of the second duct part; and a main blowing means for introducing air firstly into the second duct part then to flow towards the heater unit.

Preferably, the auxiliary blowing means is provided inside a cowl inner lower panel to drive the air through an air guide conduit to the air duct. Between the air guide conduit and the air duct is provided a shutter member to open only in the drying mode. The second duct part includes an exit means for finally discharging the heated air in the dry mode. A blowing fan worked by a motor may serve as the blowing means.

The present invention will now be described with reference to the drawings attached only by way of example.

DETAILED DESCRIPTION OF THE PREFERRED EMBODIMENTS

Figure 1:
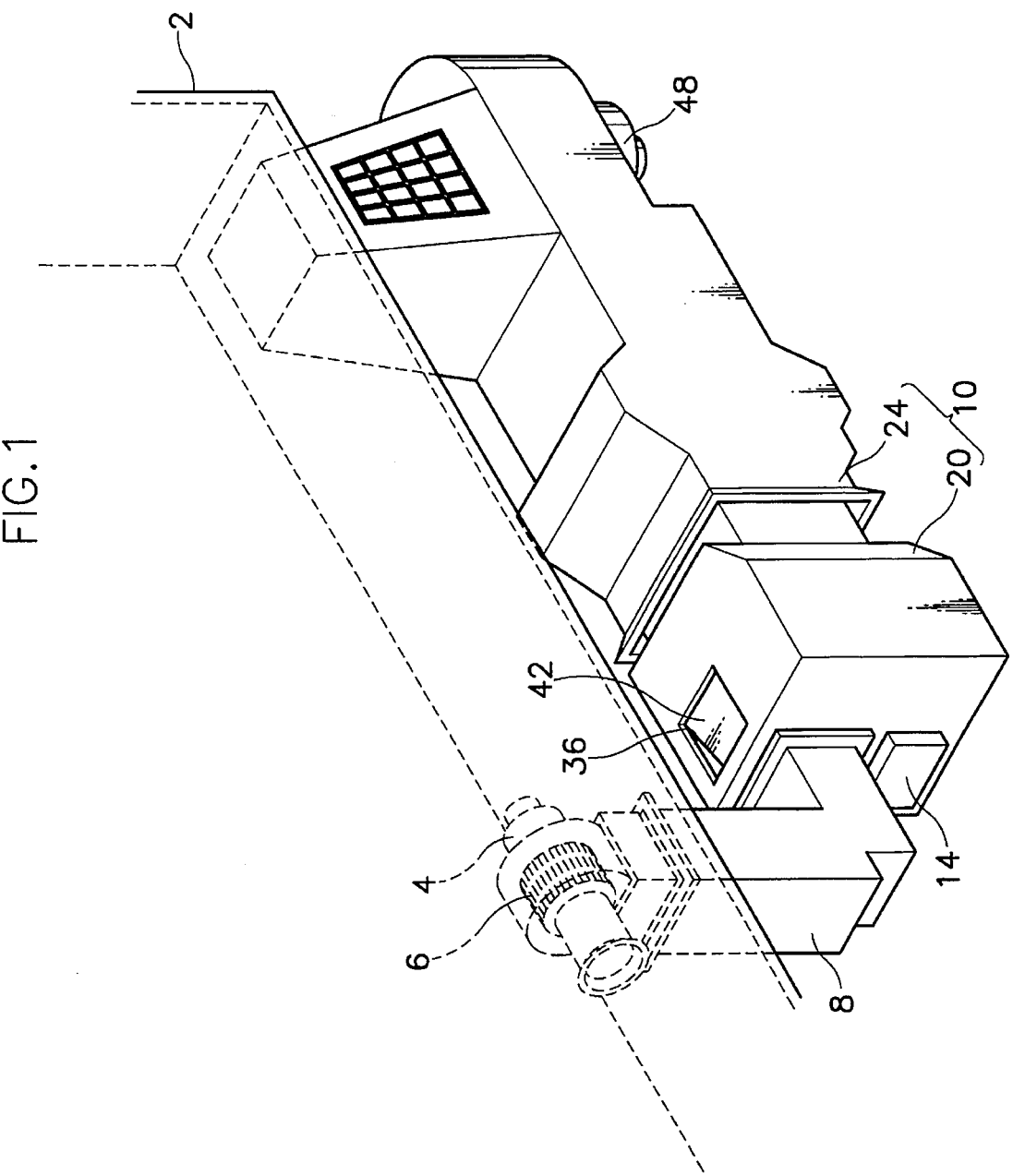
FIG. 1 is a perspective view for illustrating a vehicle air conditioner provided with an apparatus for drying the inside of the air duct according to an embodiment of the present invention.
Figure 2:
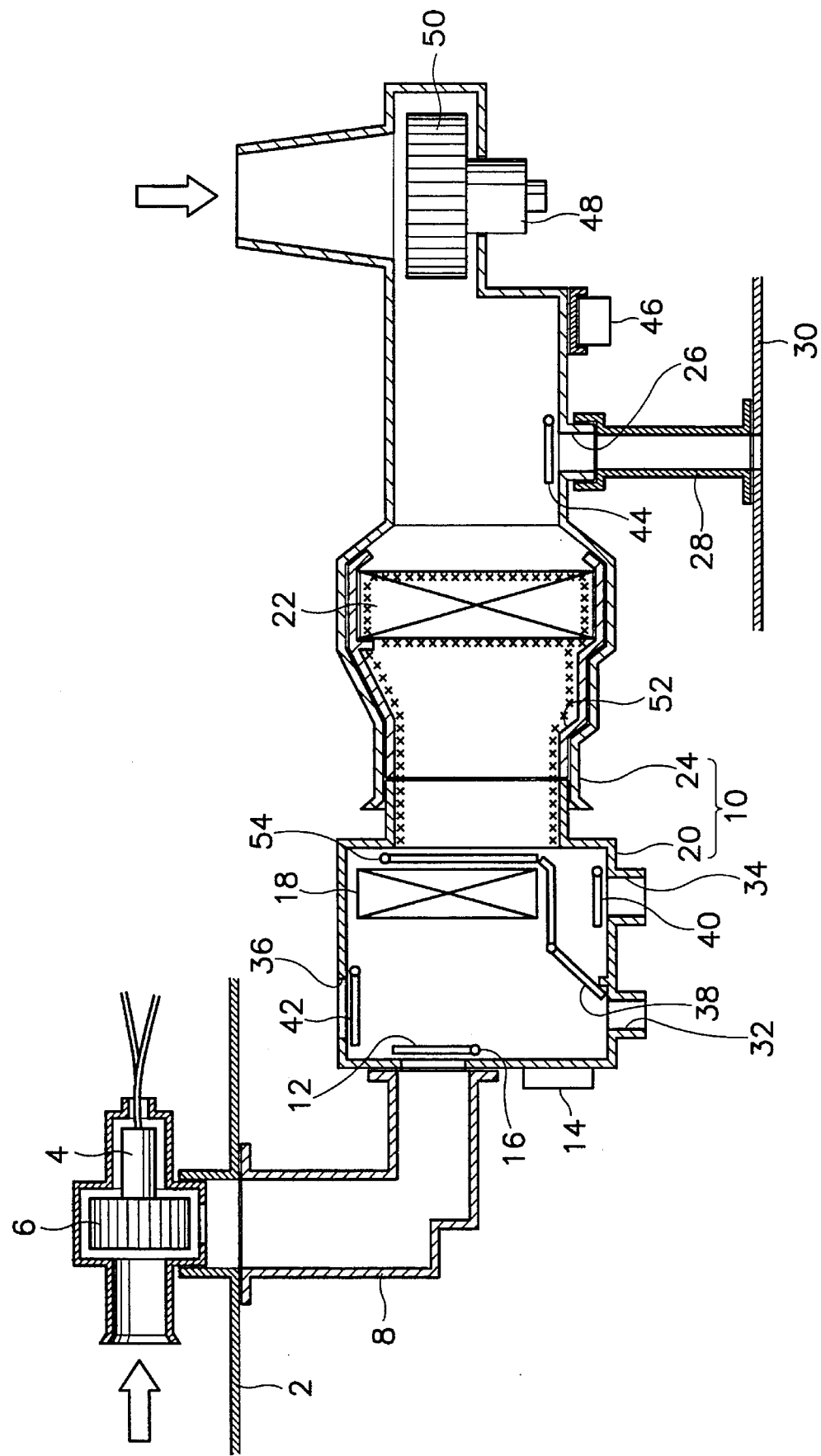
FIG. 2 is a side cross sectional view for illustrating the structure of the inventive apparatus for drying the inside of the air duct.

On the cowl inner panel 2 of a vehicle is provided a cowl outer device (not shown) with a plurality of openings, which provides passage for temporarily storing air and draining the water of rain or snow out. Also provided in this passage is an auxiliary blowing fan 6 driven by a motor 4 to supply the air used for drying the inside of the air duct of a vehicle air conditioner.

The air is guided by an air guide conduit 8 connecting the auxiliary blowing fan 6 with the air duct 10 of the air conditioner. Between the air duct 10 and the air guide conduit 8 is also provided a shutter member 12 for blocking the air supplied by the auxiliary blowing fan 6 as needed. The shutter member 12 is made of a plate, which is hinged on a hinge pin by means of an actuator 14 worked by the negative pressure of the engine.

The air duct 10 consists of a first duct part 20 containing the heater unit 18, and a second duct part 24 containing the evaporation unit 22. Hence, the shutter member 12 is disposed between the first part 20 and the air guide conduit 8. The heater unit 18 contained in the first part 20 includes a heat pipe with a plurality of heat radiation fins to circulate the cooling air for cooling the engine. The evaporation unit 22 contained in the second duct 24 includes a compressor (not shown) driven by the engine power for compressing a refrigerant gas and a condenser (not shown) for condensing the refrigerant gas. The heater unit and evaporation unit are conventional.

The gist of the present invention consists in that the air driven by the auxiliary blowing fan 6 is supplied firstly to the heater unit 18 secondly passing the evaporation unit 22, so that the air is heated flowing towards the evaporation unit to dry the inside of the second duct part 24. The air passing the evaporation unit 22 is finally discharged through an exit opening 26 provided in the second duct part 24. The exit opening 26 is connected to a discharge tube 28 communicating with an opening formed in the floor panel 30 of the vehicle.

The first duct part 20 of the air duct 10 has a three air outlets 32, 34, 36 for respectively supplying the air to the floor, to a plurality of vents provided in the instrument panel, and to the windshield. The outlets 32, 34, 36 are respectively provided with shutter members 38, 40, 42 worked by actuators (not shown). In addition, the exit opening 26 of the second duct part 24 is provided with a shutter member 44 worked by an actuator 46.

The second duct part 24 is provided with a main blowing fan 50 worked by a motor 48 to supply the air into the air duct 10. The reference numeral 52 represents a heat insulator, and 54 a shutter member used in heating mode.

In operation, selecting the heating mode, the shutter member 54 is opened to allow the air supplied by the main blowing fan 50 into the air duct 10 to flow through the heater unit 18, so that the cooling water of the engine circulating through the heater unit 18 transfers heat to the supplied air. Then, the heated air is supplied through the air outlets to the inside of the vehicle. On the other hand, selecting cooling mode, the shutter member 54 is closed to directly pass the air cooled by the evaporation unit 22 through the air outlets without passing the heater unit 18.

In this case, the heating mode allows the heated air to circulate through the air duct 10 drying the inside thereof, but the cooling mode can not supply the heated air, so that the moisture to exist inside the duct can not be eliminated, thus causing the nest of germs or microorganisms such as virus, bacteria, etc. together with offensive odours.

However, the inventive apparatus makes it possible to eliminate the moisture in the air duct 10 in the cooling mode. Namely, if working the inventive apparatus, the shutter members 38, 40, 42 are closed in the first duct part 20, while the shutter member 44 of the second duct part 24 and the shutter member 12 of the first duct part 20 are opened. Then, the auxiliary blowing fan 6 is worked to drive the air through the air guide conduit 8 towards the heater unit 18, so that the air is heated supplied to the inside of the second duct part 24, thereby drying the moisture existing in the inside thereof.

Finally, the air is discharged through the discharge tube 28 to the outside.

What is claimed is:

1. An apparatus for drying the inside of the air duct of a vehicle air conditioner with heating, cooling and drying mode, comprising:

a first duck part containing a heater unit;

a second duct part containing an evaporation unit, said first and second duct parts forming said air duct;

an auxiliary blowing means for introducing in the cooling and drying mode air firstly into said first duct part to heat the air and supply the heated air to the inside of the second duct part; and a main blowing means for introducing air firstly into said second duct part then to flow towards said heater unit.

2. An apparatus as defined in claim 1, wherein said auxiliary blowing means is provided inside a cowl inner lower panel to drive the air through an air guide conduit to said air duct.

3. An apparatus as defined in claim 2, wherein a shutter member is provided between said air guide conduit and said air duct to open only in the drying mode.

4. An apparatus as defined in claim 1, wherein said second duct part is provided with an exit means for finally discharging said heated air in the dry mode.

5. An apparatus as defined in claim 1, wherein said blowing means is a blowing fan worked by a motor.

* * * * *

UNITED STATES PATENT AND TRADEMARK OFFICE
CERTIFICATE OF CORRECTION

PATENT NO. : 5,615,491
DATED : April 1, 1997
INVENTOR(S) : Jonsik BAE

It is certified that error appears in the above-indentified patent and that said Letters Patent is hereby corrected as shown below:

In the Claims:

Claim 1, column 4, line 7, change "duck" to --duct--.

Signed and Sealed this

Tenth Day of June, 1997

Attest:

BRUCE LEHMAN

Attesting Officer     *Commissioner of Patents and Trademarks*